J. W. VAUGHAN.
MILL INSTALLATION.
APPLICATION FILED MAY 7, 1917.
1,289,319.
Patented Dec. 31, 1918.
3 SHEETS—SHEET 1.
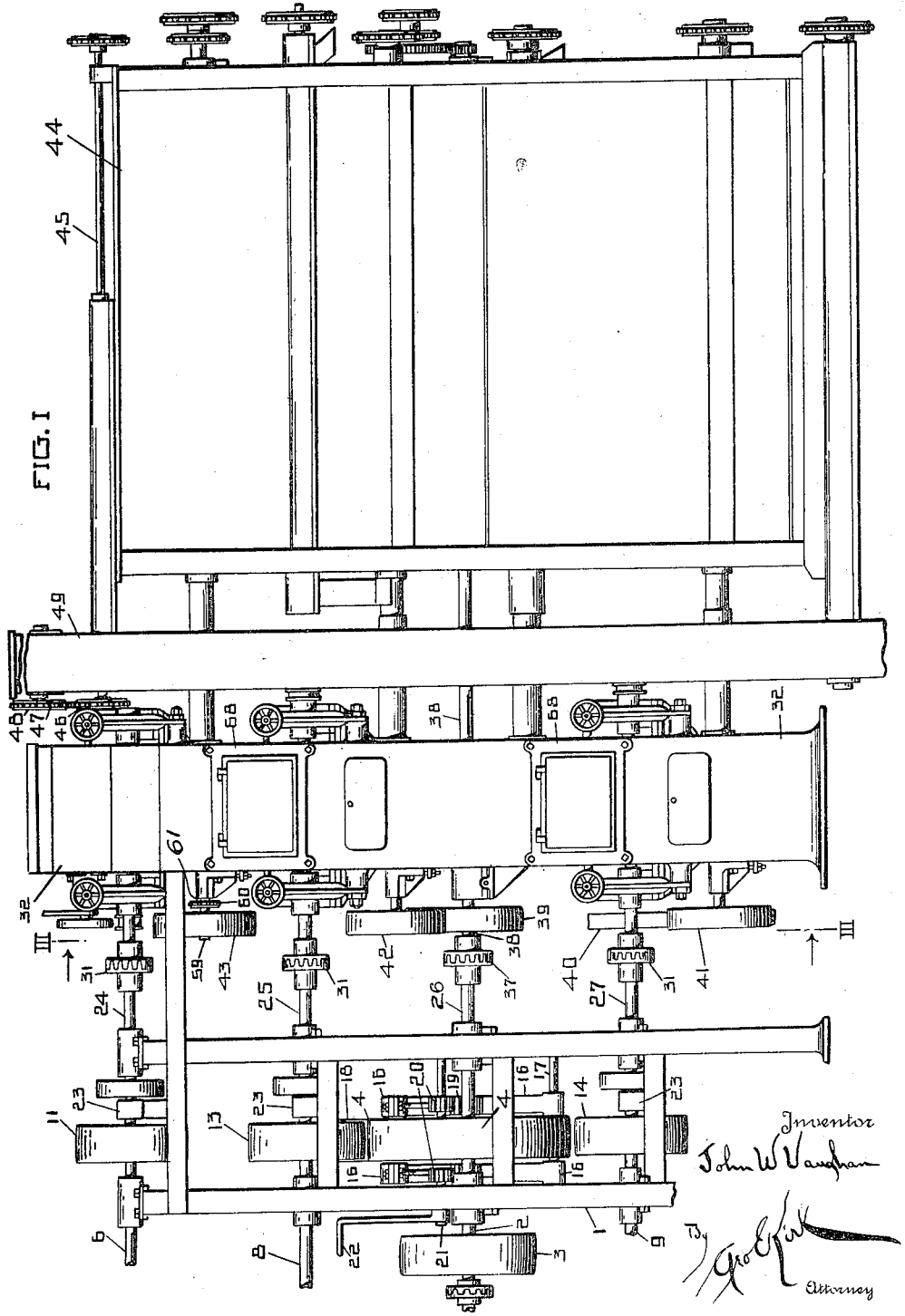

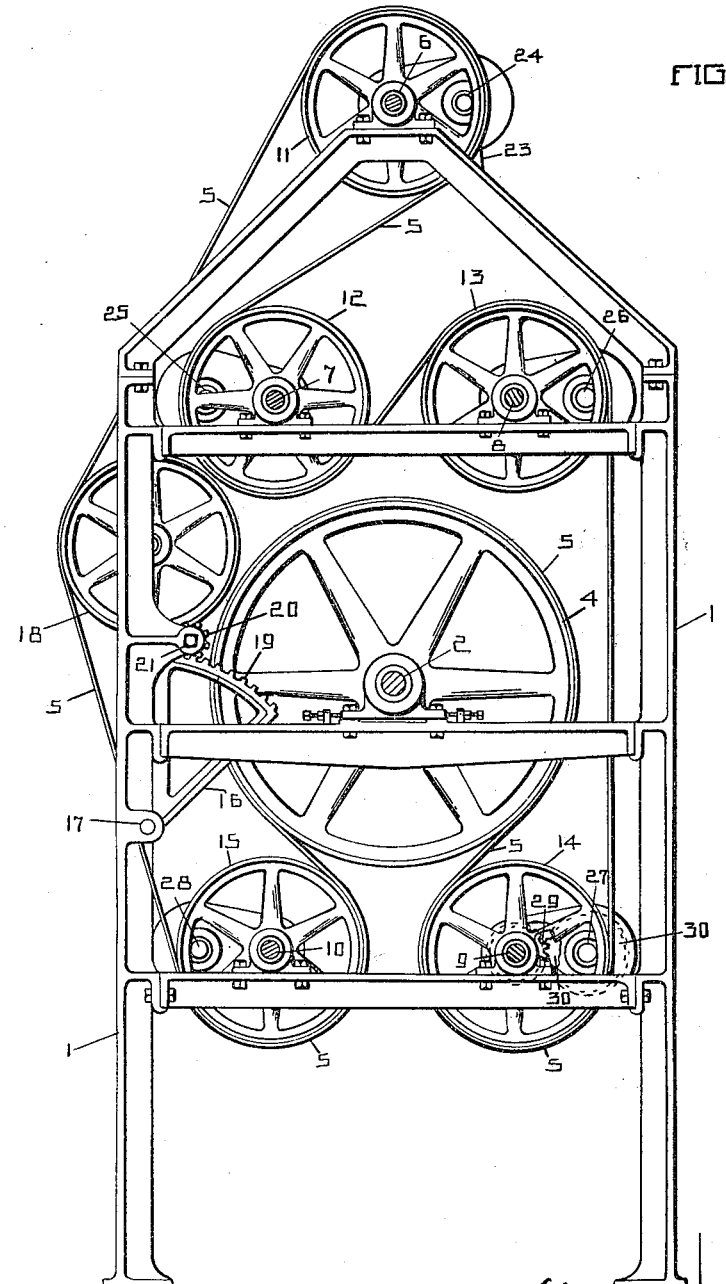

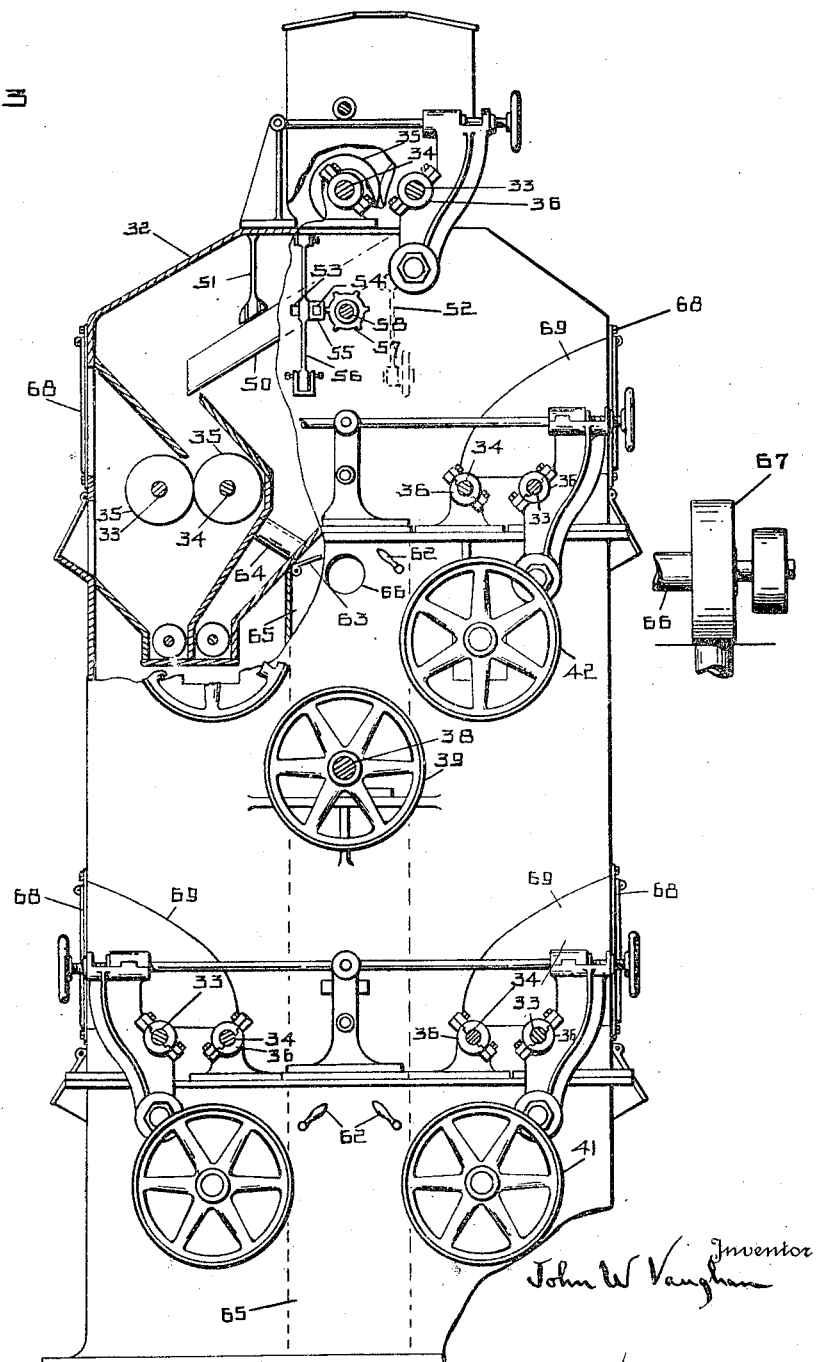

UNITED STATES PATENT OFFICE.

JOHN W. VAUGHAN, OF MEMPHIS, TENNESSEE.

MILL INSTALLATION.

1,289,319.     Specification of Letters Patent.     Patented Dec. 31, 1918.

Application filed May 7, 1917. Serial No. 166,784.

*To all whom it may concern:*

Be it known that I, JOHN W. VAUGHAN, a citizen of the United States of America, residing at Memphis, Shelby county, Tennessee, have invented new and useful Mill Installations, of which the following is a specification.

This invention relates to reduction mill installations, especially roller mills for cereal grinding as in flour manufacture.

This invention has utility when incorporated in driving and control features in differentially driven roller mills for grain in the milling of flour.

Referring to the drawings:

Figure 1 is a side elevation, with parts broken away, of an embodiment of the invention in a mill installation;

Fig. 2 is an end elevation of the driving stand; and

Fig. 3 is a section on the line III—III, Fig. 1.

The driving stand 1 may carry centrally thereof the main outboard driving shaft 2 as actuated by the driving pulley 3. This shaft 2 centrally of the driving frame has the inboard actuating pulley 4 about which may travel the gang pulley inboard actuating driving belt 5.

The term outboard as used above indicates that the member so referred to is on a shaft section protruding from its support to have a free or outboard end carrying such pulley or transmission device, while inboard refers to such position of the driving device upon its carrying shaft that the shaft has bearing support upon each side of such device.

In the frame 1 are disposed parallel with the driving shaft 2, the driven shafts 6, 7, 8, 9, 10 carrying respectively pulleys 11, 12, 13, 14, 15, actuated by the belt 5. To take up slack in the belt 5, there is mounted in the frame 1 the arm 16 having the pivot pin 17. This arm 16 carries at its free end the pulley 18 coacting with the belt 5. This arm 16 further has the segment 19 in mesh with the pinion 20 having the squared end shaft 21 with which the handle 22 may coact for shifting the belt tightener pulley 18 in bringing the belt 5 to the desired tension.

The frame 1 carries transverse bars 23 that there may be carried in the frame 1 adjacent the shafts 7, 8, 9, 10, auxiliary shafts 24, 25, 26, 27, 28. The shafts 7, 8, 9, 10, carry pinions 29 in mesh with gears 30 to act as inboard drives for these auxiliary shafts at a reduced rate of speed. Each of the shafts 7, 8, 9, 10, 24, 25, 26, 27, has an end protruding beyond the frame 1 to carry a rotary connecting means or yieldable coupling 31 effective as an axially disposed rotary driving connection which will not distribute to the driven shafts angular distortion due to any disturbance in the torque due to its receiving rotation impulses laterally of its axis as by gearing or belts.

This driving stand may have its shafts protrude from opposite sides thereof to connect with mill stands in duplex, say one at each end or may be run with the mills for a single stand upon one side thereof. The driving stand permits of a compact installation for operating the various mills for grinding, separation and grading with the desired screenings, reel separations, and spoutings.

Disposed adjacent the driving stand frame 1 is the mill housing 32 carrying shafts 33, 34 (Fig. 3) upon which shafts are the grinding rolls 35 of the various roller mills. Each of these shafts 33, 34, is connected by a coupling 31 axially disposed as to such shaft for giving the rolls 35 rotation independently of any tendency or disturbance of alinement of such rolls in their bearings 36. This insures a uniform grinding or cutting throughout the roll length, contributing not only to superiority of output and uniformity of grade, but materially lengthening the efficient life of the roll.

The main shaft 2 may have its yieldable coupling 37 connected to the shaft 38 as a conveyer, elevator and reel driving shaft. The pulley 39 may have belt 40 extending about the reel driving pulleys 41, 42, 43. Conveyers may be variously connected as to the shafts driven by these pulleys, while the shaft 38 in its extension through the reel housing 44 may be connected with the various wheels for driving additional reel and conveyer elements as well as through shaft 45, wheel 46, sprocket chain 47, sprocket 48, actuate elevators in the elevator housing 49.

Variously throughout the mill housing 32, say for effecting separation after the rolls, may be disposed vibratory screen 50 supported by the flexible or yieldable members 51, 52. In the side of the housing 32 may be the slot 53 through which protrudes the bar 54 fast with the screen 50. This bar 54 may enter the block 55, yieldably mounted upon the flexible member 56 for bearing against the tooth wheel 57 mounted on the shaft 58 driven by pinion 59 from the gear 60 on the shaft 61, actuated by the pulley 43. Accordingly, in the rotation of this pulley 43, there is a rotation of the tooth wheel 58 effecting vibration of the screen 50 for causing stock to pass therethrough and tail thereover from the next higher set of rolls. This is a compact simple screening preliminary to the reel separation, contributing materially to the capacity of the mill.

In the mill grouping for compact housing disposal, it is desirable to provide ventilation, especially from below the rolls. This can be readily effected by manipulation of the protruding handles 52 operating the vanes 63 controlling the openings 64 in communication with the housing below the rolls for ventilating to the shaft 65 between the roll sets of the housing which has the outlet duct 66, suction from which may be established by any desired means as a fan 67.

A further feature in the compactness of this housing is the accessibility of the rolls for thorough overhauling independently of tearing down the mill. The housing 36 has the removable section 68 with the lateral portions 69 extending therefrom to give it a three-sided form, reaching down to the bearings 36 so that in the release of this section it may be removed so that either or both rolls of the roll pair for such section may be removed or replaced.

What is claimed and it is desired to secure by Letters Patent is:

In a roller mill installation, a driving stand, a main driving shaft transversely of the stand, a plurality of additional shafts in said stand parallel with the main shaft, first driving connection means for driving the additional shafts from the main shaft, auxiliary shafts parallel to the additional shafts and grouped therewith to form pairs, driving means between the pairs of shafts to actuate an auxiliary shaft from the respective additional shaft of its pair, bearings in the stand through which the pairs of shafts protrude for inboard positioning of the driving means as to these stand bearings, roller mills mounted independently of the driving stand, pairs of grinding rolls for the mills, shafts for the grinding rolls protruding from the mills to approximate alinement with the pairs of stand shafts, and flexible couplings between the stand shaft pairs of rolls and the grinding rolls shafts as the only outboard connection of the stand shafts.

In witness whereof I affix my signature.

JOHN W. VAUGHAN.

Copies of this patent may be obtained for five cents each, by addressing the "Commissioner of Patents, Washington, D. C."